H. KAHRS.
HAND HOLE COVER FOR WATER METERS AND THE LIKE.
APPLICATION FILED APR. 22, 1915.

1,165,783.

Patented Dec. 28, 1915.

WITNESSES:
J. G. Kimlin
Louis A. Fitzer

INVENTOR.
Henry Kahrs
BY
ATTORNEY

UNITED STATES PATENT OFFICE.

HENRY KAHRS, OF DUMONT, NEW JERSEY.

HAND-HOLE COVER FOR WATER-METERS AND THE LIKE.

1,165,783.

Specification of Letters Patent.

Patented Dec. 28, 1915.

Application filed April 22, 1915. Serial No. 23,023.

*To all whom it may concern:*

Be it known that I, HENRY KAHRS, a citizen of the United States, and resident of Dumont, in the county of Bergen and State of New Jersey, have invented certain new and useful Improvements in Hand-Hole Covers for Water-Meters and the like, of which the following is a specification.

This invention relates to hand-hole covers for water meters and other fixtures in which the cover is retained in place by bolts, each bolt engaging a pair of oppositely disposed fingers, the object being to provide a cover with an extra or duplicate set of fingers.

It is found in practice, more particularly in water meters (which are usually placed in cellars and other cold localities) that when the water contained therein freezes, the weakest part is purposely at the lower hand hole cover, wherein the bolt fingers are calculated to crack when the ice expands, thus saving the housing of the meter. If there are four bolts to hold the hand hole cover in place, then there are always four pairs of fingers to engage these bolts, and when one finger or a pair of fingers or even all the four pair are cracked or broken, the cover is useless and scrapped. By duplicating the fingers, as will be fully hereinafter described, the life of the cover is doubled.

Figure 1:
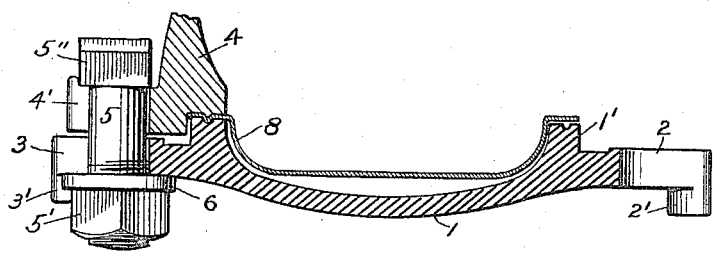
Figure 2:
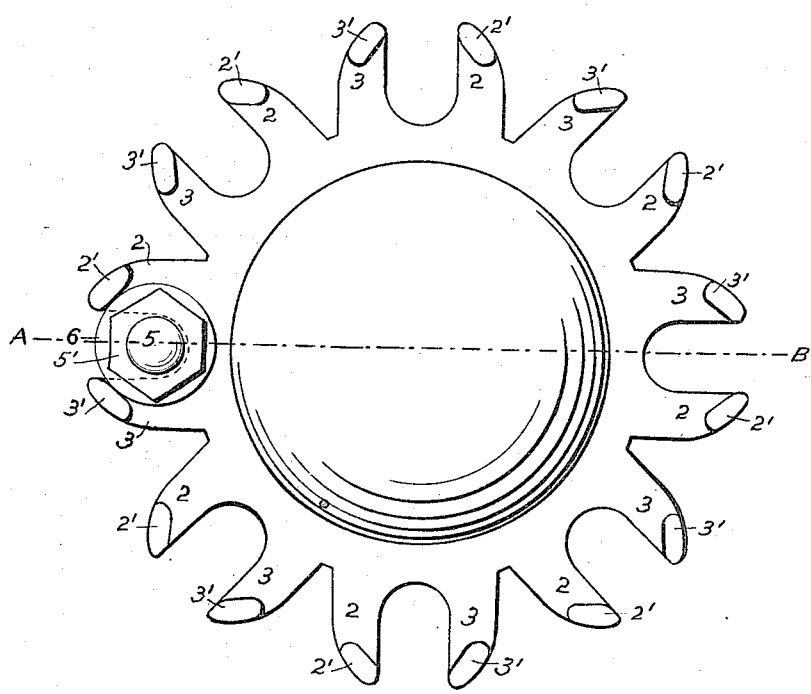

Reference being had to the accompanying drawings, Figure 1 is a central sectional view of my improved cover on line A—B of Fig. 2. Fig. 2 is an inverted plan view of Fig. 1.

Similar reference characters denote like parts in the two views.

The cover is usually composed of a dished central plate 1, having an annular flange, 1', on its interior. Extending radially are right and left fingers, 2, 3, each having a boss or projection 2', 3', respectively, as shown, for the purpose of holding a washer, 6, in position.

The lower flange and housing of a water meter, 4, are shown. A brass shell, 8, is usually placed between the cover and the meter body, so that the water does not contact with the iron casting of which the cover is made. Four bolts, 5, and nuts, 5', hold the cover in place, the head, 5" of each bolt being held upon and between four sets of fingers, 4', which are part of the body casting.

The operation is as follows:

In case that one or more fingers are broken or cracked, all the bolts are loosened, the cover given a turn to right or left—one eighth of the space in the present case—when a new perfect set of fingers will be opposite the fingers on the body. The bolts are then reinserted and tightened up, and the meter is ready again for operation.

What I claim as new, is:—

1. In a cover for water meters and the like, a cover having a plurality of reserve fingers equal in number to the number of active fingers.

2. In a cover for water meters and the like, a cover provided with a double set of radial fingers extending outwardly from a plate, one set of said fingers adapted for direct connection, and the other set of fingers being inactive and out of alinement with any fastening means when positioned on a meter.

Signed at New York city in the county and State of New York, this 21st day of April, A. D. 1915.

HENRY KAHRS.

Witnesses:
 F. G. KIMLIN,
 LOUIS A. FITZER.

Copies of this patent may be obtained for five cents each, by addressing the "Commissioner of Patents, Washington, D. C."